United States Patent [19]
Lansberry

[11] Patent Number: 5,465,770
[45] Date of Patent: Nov. 14, 1995

[54] TREE HARVESTING APPARATUS WITH IMPACT HAMMER

[75] Inventor: John B. Lansberry, Woodland, Pa.

[73] Assignee: Stone & Wood, Inc., Woodland, Pa.

[21] Appl. No.: 341,905

[22] Filed: Nov. 15, 1994

[51] Int. Cl.⁶ ................................................ A01G 23/08
[52] U.S. Cl. .............................. 144/336; 37/302; 83/928; 144/3. D; 144/34. R; 144/34 E
[58] Field of Search ................ 37/301, 302; 30/379, 30/379.5; 83/928; 144/3 D, 34 R, 34 A, 34 E, 34 B, 335, 336, 339, 193 R, 193 A, 2 N; 173/44, 87, 122, 184; 241/101.7

[56] References Cited

U.S. PATENT DOCUMENTS

| | | | |
|---|---|---|---|
| 2,474,037 | 6/1949 | Cuthrell | 144/134 A |
| 3,376,907 | 4/1968 | McNeal | 144/2 N |
| 3,421,558 | 1/1969 | Thompson | 144/34 E |
| 3,688,824 | 9/1972 | Bodine | 144/34 A |
| 3,943,984 | 3/1976 | Kinsley, Jr. | 144/2 N |
| 3,989,075 | 11/1976 | Coughlan, Jr. | 144/2 N |
| 4,141,398 | 2/1979 | Widegren et al. | 144/2 N |

FOREIGN PATENT DOCUMENTS 1690615  11/1991  U.S.S.R. ................. 144/2 Z

*Primary Examiner*—W. Donald Bray
*Attorney, Agent, or Firm*—Cushman Darby & Cushman

[57] ABSTRACT

An apparatus for severing a standing tree at a trunk portion thereof includes a housing constructed and arranged to be movable to a tree harvesting location. Holding structure is constructed and arranged with respect to the housing to hold a portion of the stem of the tree while the trunk portion thereof is severed. A cutting blade mounted so as to be movable between retracted and extended position with respect to the tree. Impact hammer structure is operatively coupled to the cutting blade such that successive impacts generated by the impact hammer structure on the cutting blade move the cutting blade progressively through the trunk portion of the tree. Actuating structure is operatively associated with the cutting blade and constructed and arranged to move the cutting blade between its retracted and extended positions such that when the cutting blade is in an extended position and in engagement with the trunk portion while the holding structure holds the stem of the tree, the successive impacts move the cutting blade to sever the standing tree.

16 Claims, 5 Drawing Sheets

5,465,770

TREE HARVESTING APPARATUS WITH IMPACT HAMMER

The present invention relates to harvesting and processing timber, and, more particularly, to a method and apparatus for harvesting standing trees.

Conventional methods and apparatus have been developed to harvest standing trees. One such apparatus was disclosed in U.S. Pat. No. 3,999,582 which utilizes opposing pivoting shear blades operated by associated hydraulic fluid actuators. The shear blades are brought into contact with the tree and are moved by the fluid actuators toward each other to shear the tree. This conventional shearing method works well in soft wood, but is not as effective in hard woods. For example, tremendous power and force are required to shear hard woods with the conventional pivoting shearing blade. Further, the forces required to shear hard wood may cause equipment malfunction or cause the equipment to degrade quickly.

Known tree shear apparatus typically cause fiber destruction and/or loss due to tearing and splitting of the wood by the shear.

Accordingly, need exists to provide a method and apparatus for affecting harvesting of both soft and hard wood standing trees, without generating tremendous forces within the apparatus and without significant fiber destruction.

SUMMARY OF THE INVENTION

An object of the present invention is to fulfill the need referred to above. In accordance with the principles of the present invention, this objective is obtained by providing an apparatus for severing a standing tree at a trunk portion thereof. The apparatus includes a housing constructed and arranged to be movable to a tree harvesting location. Holding structure is constructed and arranged with respect to the housing to hold a portion of the stem of the tree while the trunk portion is severed. A cutting blade is mounted in the housing so as move between retracted and extended positions with respect to the tree. Impact hammer structure is operatively coupled to the cutting blade such that successive impacts generated by the impact hammer structure on the cutting blade move the cutting blade progressively through the trunk portion of the tree. Actuating structure is operatively associated with the cutting blade and constructed and arranged to move the cutting blade between its retracted and extended positions so that when the cutting blade is in an extended position and in engagement with the trunk portion with the holding structure holding the stem portion of the tree, the successive impacts move the cutting blade to sever the standing tree.

Another object of the invention is to provide a method for harvesting a standing tree with a cutting apparatus. The cutting apparatus includes a cutting blade, impact hammer structure associated with the cutting blade, and actuating structure constructed and arranged to move the cutting blade into or out of engagement with the tree. The method includes positioning the cutting apparatus adjacent the stem of the standing tree. The cutting blade is moved by the actuating structure into engagement with the stem at a cutting location. The impact hammer structure is then operated while the cutting blade is engaged with the stem so as to progressively move the cutting blade through the stem until the stem is severed.

Another object of the present invention is the provision of an apparatus of the type described which is simple in construction, effective in operation and economical to manufacture and maintain.

These and other objects of the present invention will become apparent during the course of the following detailed description and appended claims.

The invention may be best understood with reference to the accompanying drawings wherein an illustrative embodiment is shown.

Figure 6:
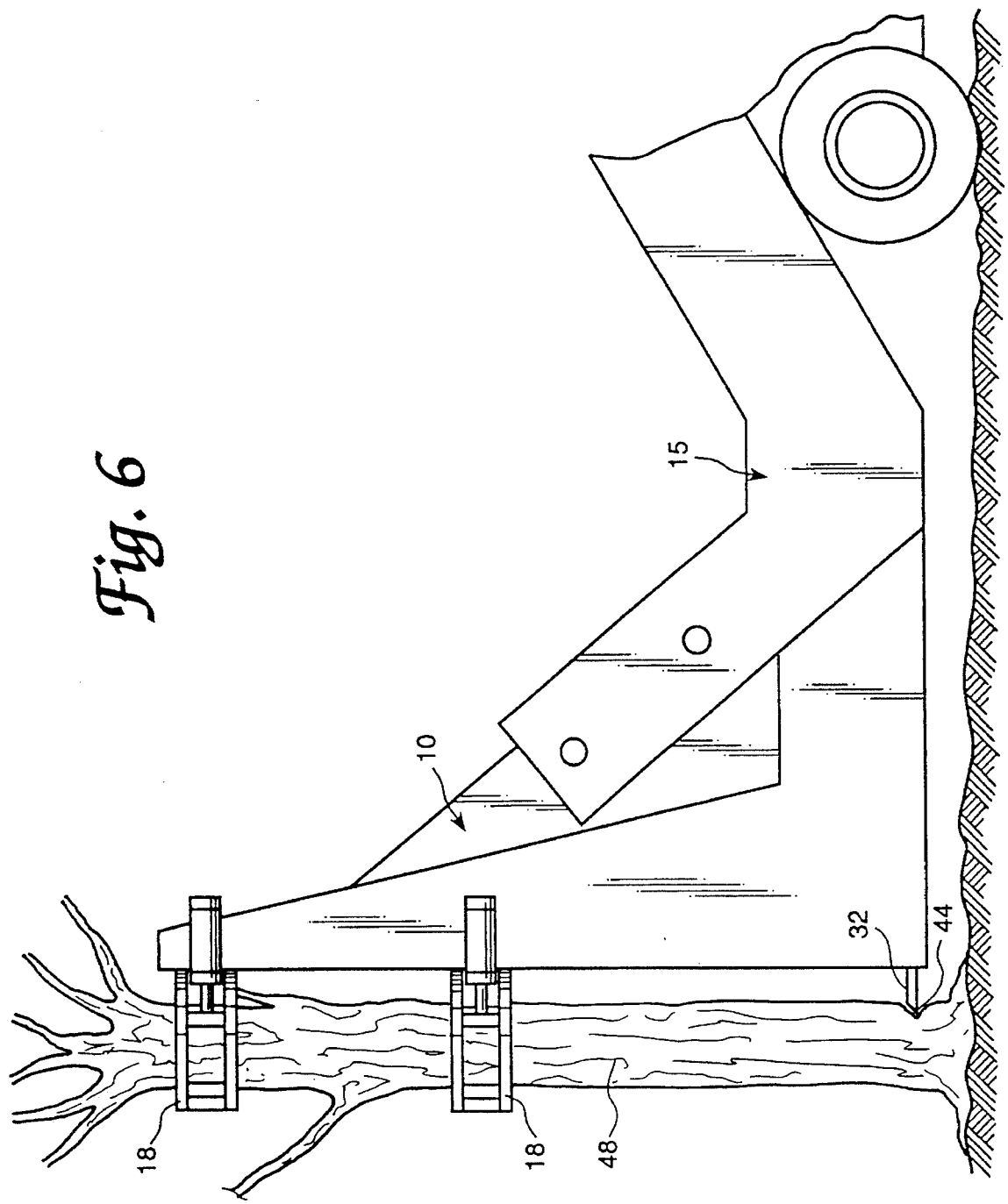
FIG. 6 is a side elevational view of the hammer-shear apparatus mounted to a wheeled vehicle and in position to sever a standing tree.

Referring now more particularly to the drawings, a hammer-shear apparatus, generally indicated at 10, which embodies the principles of the present invention is shown. The apparatus 10 includes a housing, generally indicated at 12, preferably of sheet metal construction having a base 14 constructed and arranged to be mounted on a wheeled vehicle 15 (a portion thereof is shown in FIG. 6) such as a front end loader, tree harvester, or similar vehicle via flange 13 which accommodates movement of the apparatus 10 to a tree harvesting location as required. An upright portion 16 of the housing 12 extends from the base 14.

Figure 1:
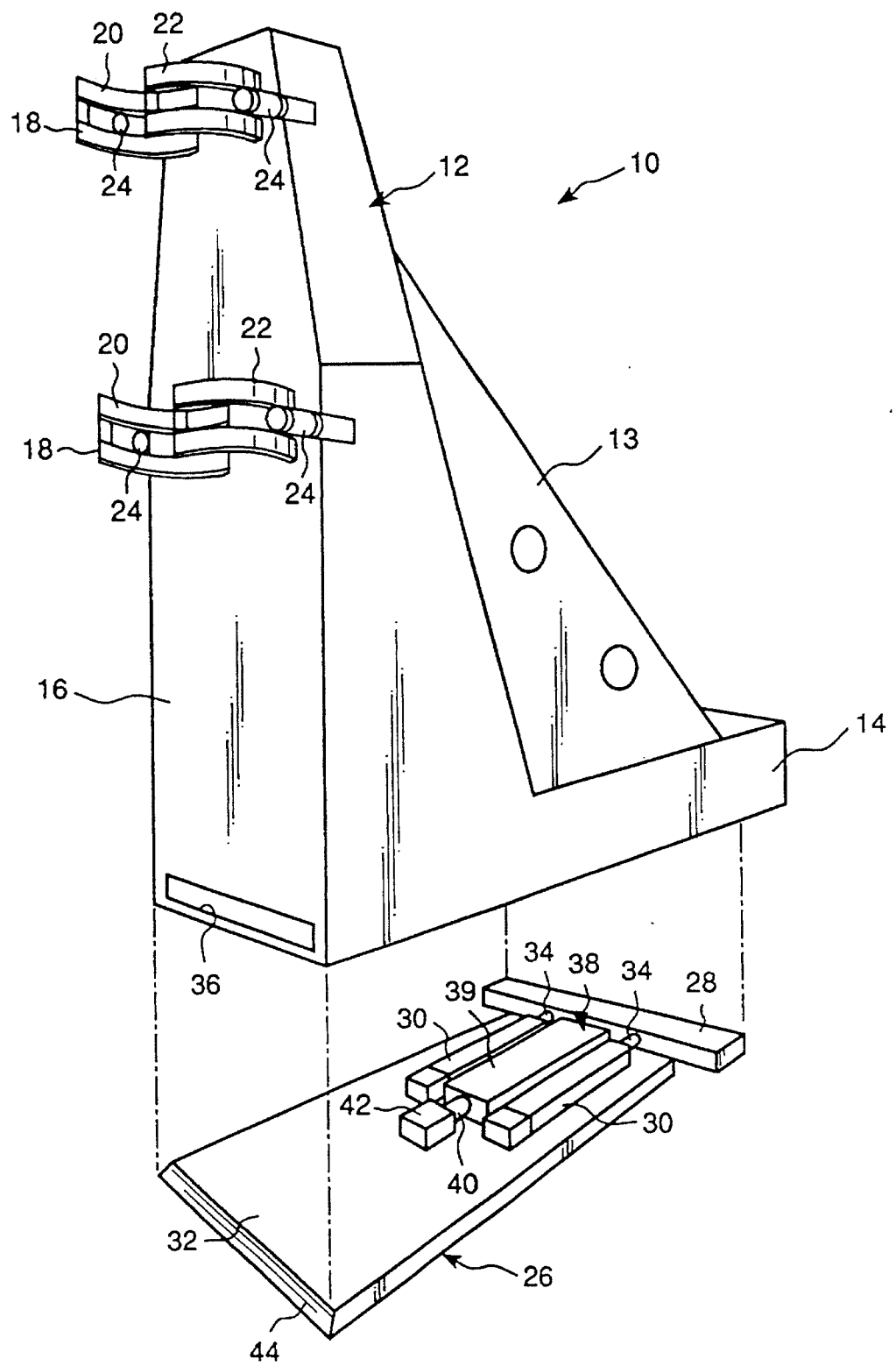
FIG. 1 is a schematic, exploded perspective view of a hammer-shear apparatus shown with a carrier plate and a bottom portion of the housing removed for clarity of illustration, provided in accordance with the principles of the present invention.
Figure 3:
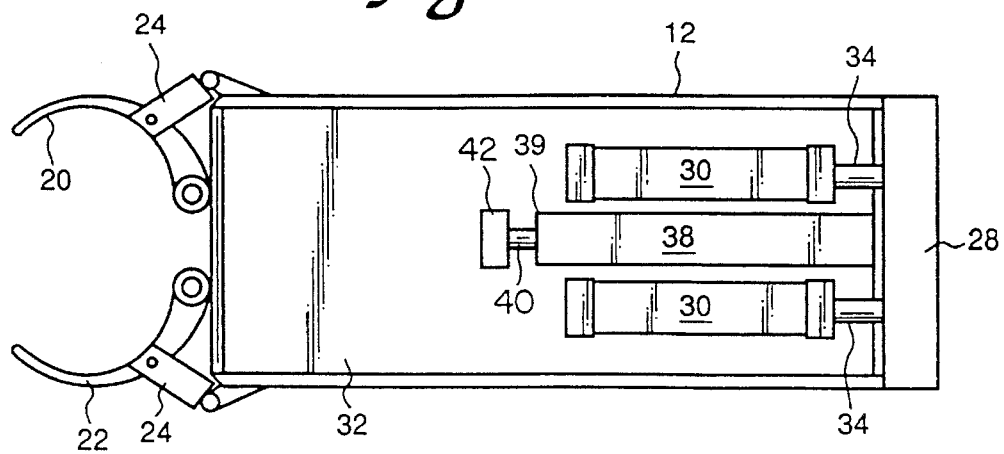
FIG. 3 is a plan view of the hammer-shear apparatus of FIG. 2, shown with the carrier plate and a portion of the housing and removed to illustrate the blade structure in a retracted position.
Figure 5:
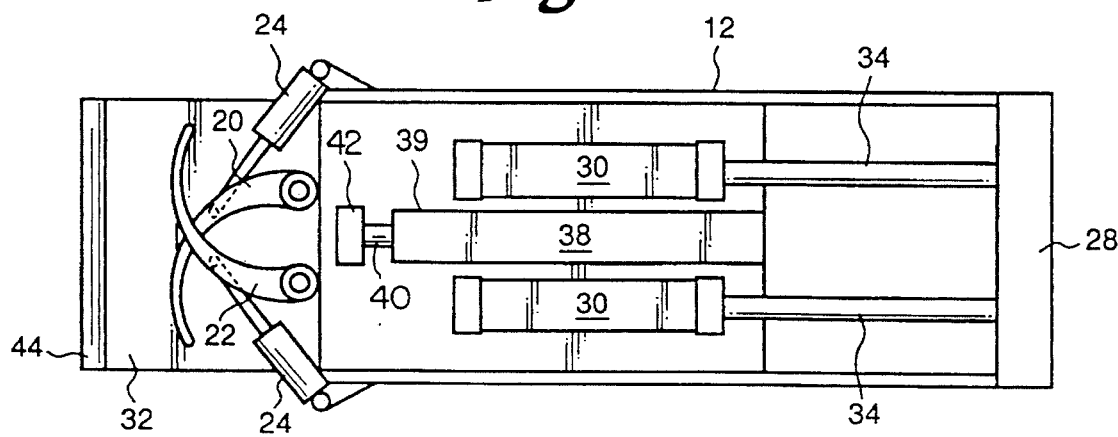
FIG. 5 is a view similar to FIG. 3 showing the blade structure in an extended position and with the gripping elements closed.

As shown in FIG. 1, a plurality of vertically stacked hydraulic gripping elements 18 are arranged at the front of the upright portion 16 of the housing 12 defining holding structure to hold portions of the tree stem while the trunk portion thereof is being severed. In the illustrated embodiment, two generally identical hydraulic gripping elements 18 are provided, each including first and second jaw members 20 and 22. Each jaw member is pivotable about a corresponding axis and moved by an associated hydraulic cylinder device 24. The hydraulic gripping elements 18 and hydraulic cylinder devices 24 are conventional and may be of the type disclosed in U.S. Pat. No. 3,999,582, the disclosure of which is hereby incorporated hereinto by this reference. Movement of the jaw members 20 and 22 from an open, inoperative position, as shown in FIG. 3, to a closed, operative position (FIG. 5) encircles and holds a portion of the tree stem so as to hold the standing tree during a cutting operation, which will be described below.

Figure 4:
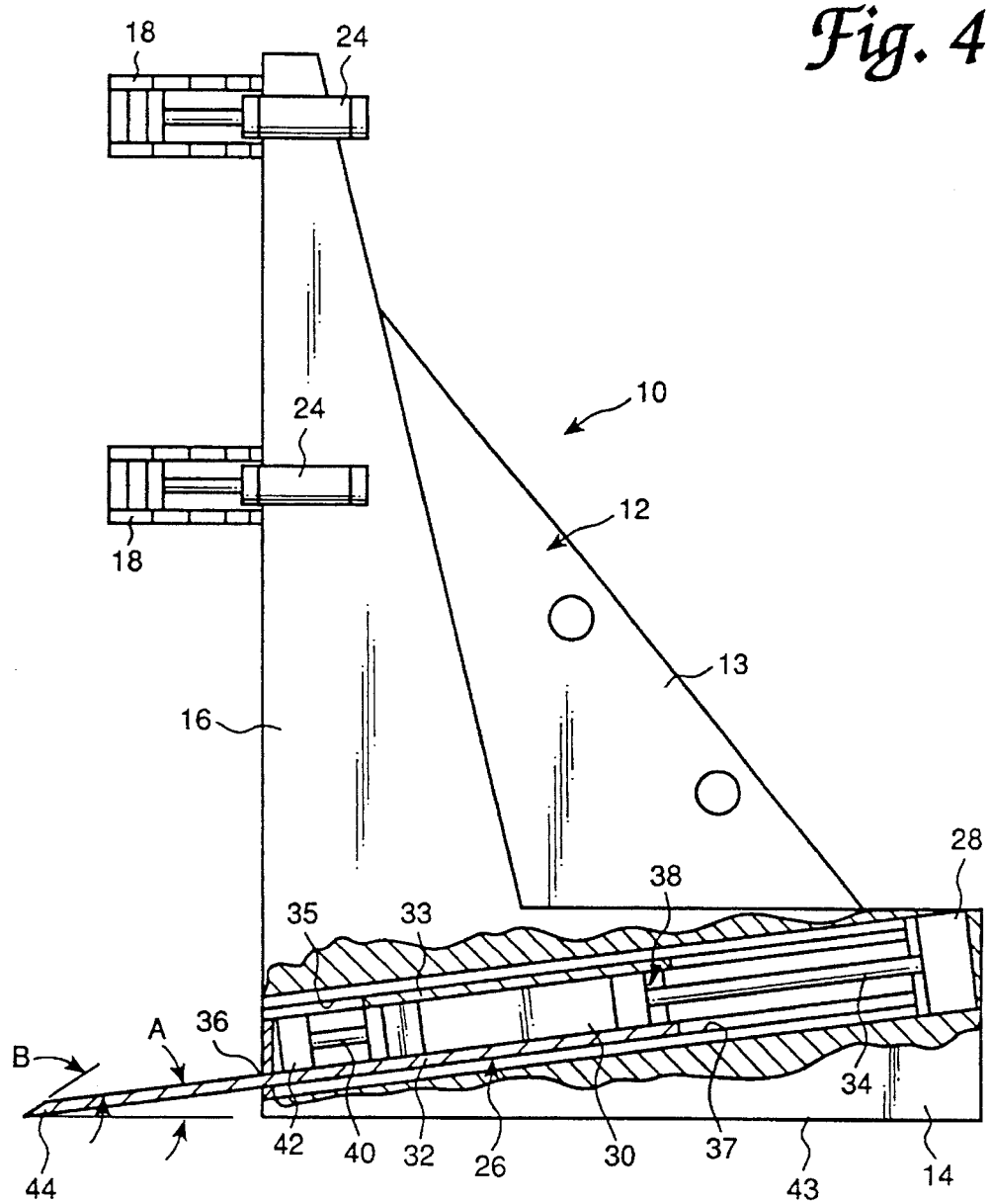
FIG. 4 is a view similar to FIG. 2, showing the blade structure in an extended position so as to sever a standing tree.

In accordance with the principles of the invention, shear blade structure, generally indicated at 26, is supportably mounted in the base 14 of the housing 12, so as to be disposed at an angle A, of approximately 7.5 degrees with respect to the horizontal (FIG. 4). Such orientation ensures that a cutting blade 32 is disposed to strike the standing tree at an angle to achieve the proper leverage to sever the standing tree, as will become more apparent below. The shear blade structure 26 includes a base member 28 affixed to a rear surface of the base 14 of housing 12, a pair of hydraulic cylinders 30, defining actuating structure, mounted on the cutting blade 32 at one portion thereof and affixed to a carrier plate 33 at an opposite portion thereof such that movement of the hydraulic cylinders 30 moves both the cutting blade 32 and the carrier plate 33. The carrier plate 33 is mounted for movement within channel 35 of the housing 12 so as to support and guide the movement of the cutting blade 32 along channel 37 in housing 12. The rod 34 of each hydraulic cylinder 30 is fixed to the base member 28 such that the hydraulic cylinders 30 may move the cutting blade 32 along channel 35 so as to extend through opening 36 defined in the front portion of the housing 12 and in communication with channel 37. Thus, the cutting blade 32 is extendable and retractable through the opening 36 and is disposed generally transverse with respect to the upright portion 16 of the housing 12. As shown in FIG. 4, the edge 44 of the cutting blade 32 is angled approximately 30 degrees from the horizontal (angle B) to facilitate cutting. The cutting blade 32 is preferably composed of approximately one inch thick alloy steel, forged to a 40–50 Rockwell hardness.

The shear blade structure 26 also includes impact hammer structure, generally indicated at 38. The impact hammer structure 38 includes at least one hydraulic impact hammer 39 mounted on the bottom surface of the carrier plate 33 between the pair of hydraulic cylinders 30. The tool 40 of the impact hammer 39 is coupled to the cutting blade 32 via block 42 fixed by welding or the like to the upper surface of the cutting blade 32. Thus, movement of the impact hammer 39 moves the cutting blade 32 axially. The hydraulic impact hammer 39 may be of any conventional construction. Examples of such hammers 39 include NPK Co. Model H-2XA, INDECO Corp. Model MES550, and Rammer Corp. Model S-25. These hammers have a hammer impact class of approximately 750/538 J/ft-lb.

Figure 7:
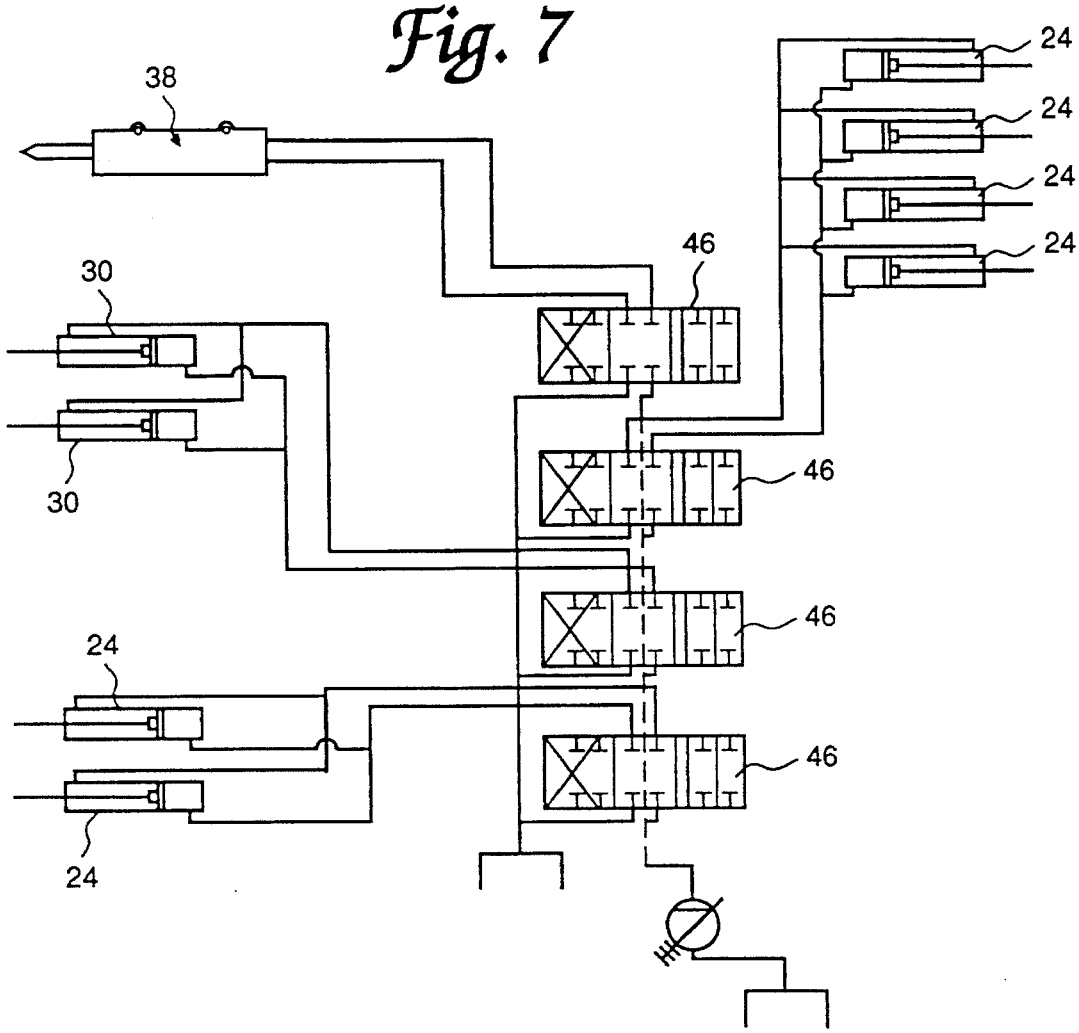
FIG. 7 is a schematic illustration of the hydraulic circuit of the hammer-shear apparatus of the invention.

It can be appreciated that pressurized hydraulic fluid for operating the various hydraulic cylinders 24 and 30 and the hydraulic impact hammer 39 may be derived from the hydraulic system of the vehicle 15 and controlled by appropriate valves. FIG. 7 is a schematic illustration of the hydraulic circuit of the apparatus 10. In the illustrated embodiment, four control valves 46 are provided which control the operation of the impact hammer 39, the pair of hydraulic cylinders 30 for moving the cutting blade 32, and the hydraulic cylinders 24 for moving the upper and lower gripping elements 18. Thus, the control valves 46 provide the operator with full control of the apparatus 10 of the invention.

With reference to the drawings, to sever a standing tree 48, the apparatus 10 is moved into position adjacent the standing tree by the vehicle 15 (FIG. 6). The gripping elements 18 are then moved to their operative positions (FIG. 5) by the hydraulic cylinder devices 24 so as to encircle and hold portions of the tree stem. The hydraulic cylinders 30 are actuated to bring the edge 44 of the cutting blade 32 into engagement with the tree trunk. The impact hammer 39 is in a neutral position until the cutting blade 32 encounters resistance. Thus, when the edge 44 of the cutting blade 32 engages the tree trunk, the impact hammer 39 activates and repeatedly fires into the tree in response to the pressure and resistance experienced by the cutting blade 32. Thus, the impact hammer 39 repeatedly moves the cutting blade 32, at the inclination defined above, to progressively cut through the tree trunk. The hydraulic cylinders 30 continuously force the cutting blade 32 into engagement with the tree, as the impact hammer 39 moves the cutting blade 32 through the tree trunk. Since the cutting blade 32 is angled and cuts across the grain of the tree in a chisel-type method, fiber damage to the severed tree is minimized.

Once the tree has been severed, the gripping elements 18 can be moved to their inoperative positions (FIG. 3) to release the tree stem so that the tree may be processed further. The hydraulic cylinders 30 retract the cutting blade 32 within the base 14 so as to be in position to initiate cutting of another tree.

Figure 2:
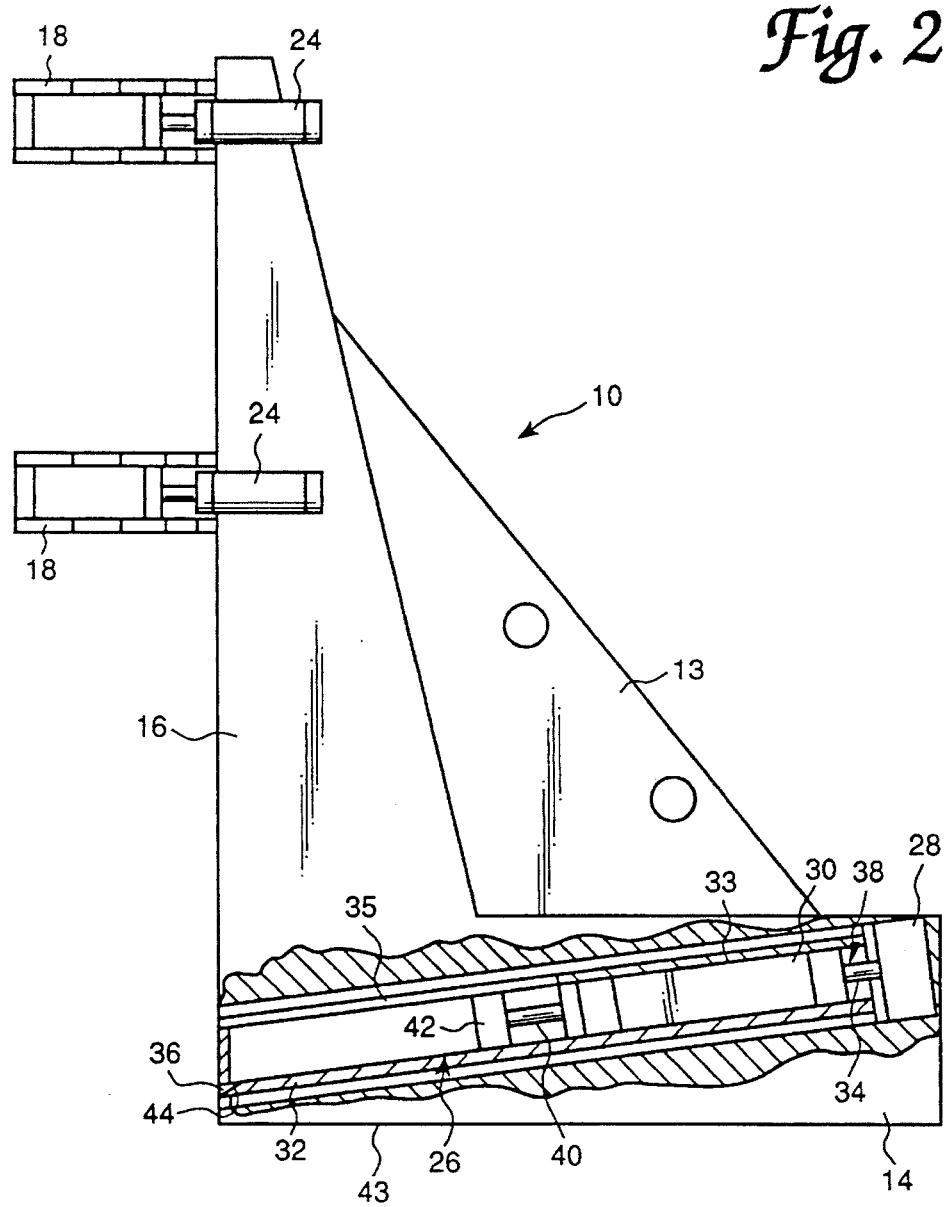
FIG. 2 is a schematic, side elevational view of the hammer-shear apparatus, shown with a portion of the housing removed so as to show the blade structure in a retracted position.
Figure 8:
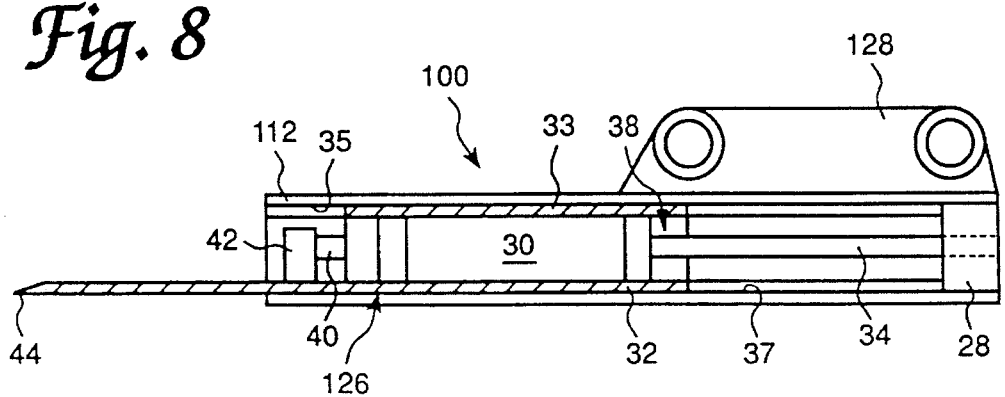
FIG. 8 is a partial sectional view of a second embodiment of a tree harvesting apparatus constructed and arranged to be mounted to a vehicle.
Figure 9:
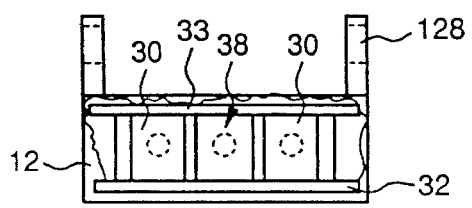
FIG. 9 is an end view of the apparatus of FIG. 8, shown with a portion of the housing removed for clarity of illustration.

With reference to FIGS. 8 and 9, the shear blade structure may be configured as a separate tree harvesting apparatus 100 constructed and arranged to be attached to a conventional wheeled carrier (not shown) so as to be movable to a tree harvesting location. The apparatus includes a housing 112 and a shear blade structure, generally indicated at 126. The shear blade structure is identical to the shear blade structure 26, and like parts are given the same numerals in the drawings. The housing 112 includes mounting flanges 128 extending from an upper surface thereof. The flanges 128 are constructed and arranged to be coupled to a carrier. The carrier may be configured to include structure for orienting the shear blade structure 126 in a manner similar to that of FIG. 2, wherein the cutting blade 32 is disposed at an angle of approximately 7.5 degrees with respect to the horizontal surface 43 of the housing 12, to facilitate cutting. The carrier may also be constructed and arranged to include gripping structure to hold a stem portion of the tree during cutting of the trunk portion thereof.

The aforementioned impact cutting method works well in hard wood trees and equally well in soft wood trees. When the edge 44 of the cutting blade 32 becomes worn, it may be sharpened by a simple grinding procedure. Further, significantly less power and force are required to harvest a standing tree with the apparatus of the invention as compared to conventional pivoting-shear type devices. Although the apparatus of the invention has been disclosed as utilizing hydraulic energy, it can be appreciated that pneumatic, electric, or mechanical, inertial-type energy may be utilized to provide the impact force for the cutting action.

It can be appreciated that the apparatus of the invention provides an easy and effective way to harvest a standing tree without generating excessive forces in the equipment.

It thus will be seen at the objects of this invention had been fully and effectively accomplished. It will be realized, however, that the foregoing preferred embodiment of the present invention has been shown and described for the purposes of illustrating the structural and functional principles of the present invention and are subject to change without the departure from such principles. Therefore, this invention includes all modifications encompassed within the spirit of the following claims.

What is claimed is:

1. An apparatus for severing a standing tree at a trunk portion thereof, comprising:

a housing constructed and arranged to be movable to a tree harvesting location;

holding structure constructed and arranged with respect to said housing to hold a portion of the stem of the tree while the trunk portion thereof is severed;

a cutting blade mounted so as to be movable between retracted and extended positions with respect to the tree held by the holding structure;

impact hammer structure operatively coupled to said cutting blade such that successive impacts generated by said impact hammer structure on said cutting blade move said cutting blade progressively through the trunk portion of the tree, and actuating structure operatively associated with said cutting blade and constructed and arranged to move said cutting blade between its retracted and extended positions such that when said cutting blade is in an extended position and in engagement with the trunk portion while said holding structure holds the stem of the tree, the successive impacts move the cutting blade to sever the standing tree.

2. The apparatus according to claim 1 wherein said housing includes a portion extending generally upright so as to be adjacent the tree stem during a tree harvesting operation, said holding structure being disposed on said upright portion of said housing and comprises gripping structure constructed and arranged to move between an inoperative position and an operative position, such that when said gripping structure is in said operative position, said gripping structure substantially encircles and holds said portion of the stem.

3. The apparatus according to claim 2 wherein said gripping structure includes at least two vertically spaced gripping elements, each gripping element being constructed and arranged to be moved between an inoperative and operative position.

4. The apparatus according to claim 2, wherein a portion of the cutting blade is constructed and arranged to extend through an opening in said housing so as to be generally transverse with respect to said upright portion of said housing.

5. The apparatus according to claim 1, wherein said cutting blade is constructed and arranged so as to be inclined with respect to a longitudinal axis of the tree.

6. The apparatus according to claim 5, wherein said cutting blade is inclined downwardly at an angle of approximately 7.5 degrees with respect to a horizontal surface of a base of said housing.

7. The apparatus according to claim 1, wherein said actuating structure includes a pair of hydraulic cylinders coupled to said cutting blade for moving said cutting blade between the extended and retracted positions.

8. The apparatus according to claim 7, wherein said impact hammer structure includes an impact hammer coupled to said cutting blade and constructed and arranged to move said cutting blade through the trunk portion of the standing tree.

9. The apparatus according to claim 7, wherein said hydraulic cylinders are coupled to a carrier plate opposite said cutting blade, said carrier plate being constructed and arranged with respect to said housing so as to guide movement of said hydraulic cylinders and thus movement of said cutting blade, with respect to said housing.

10. The apparatus according to claim 8, wherein said impact hammer is constructed and arranged to have an impact class of approximately 750/538 J/ft-lb.

11. An apparatus for severing a standing tree at a trunk portion thereof, comprising:

a housing constructed and arranged to mounted to a wheeled carrier so as to be movable to a tree harvesting location;

a cutting blade mounted so as to be movable between retracted and extended positions with respect to a standing tree;

impact hammer structure operatively coupled to said cutting blade such that successive impacts generated by said impact hammer structure on said cutting blade move said cutting blade progressively through the trunk portion of the tree; and actuating structure operatively associated with said cutting blade and constructed and arranged to move said cutting blade between its retracted and extended positions such that when said cutting blade is in an extended position and in engagement with the trunk portion, the successive impacts move the cutting blade to sever the standing tree.

12. The apparatus according to claim 11, wherein said actuating structure includes a pair of hydraulic cylinders coupled to said cutting blade for moving said cutting blade between the extended and retracted positions.

13. The apparatus according to claim 11, wherein said impact hammer structure includes an impact hammer coupled to said cutting blade and constructed and arranged to move said cutting blade through the trunk portion of the standing tree.

14. A method for cutting a standing tree with a cutting apparatus, the cutting apparatus including a cutting blade, impact hammer structure associated with the cutting blade, and actuating structure constructed and arranged to move said cutting blade to engage the tree, the method comprising the steps of:

positioning the cutting apparatus adjacent the stem of the standing tree, moving the cutting blade by said actuating structure into engagement with the stem at a cutting location, and operating the impact hammer structure while said cutting blade is engaged with the stem so as to progressively move the cutting blade through the stem until the stem is severed.

15. The method according to claim 14, wherein after positioning the cutting apparatus, the stem is gripped so as to be held stationary with respect to said cutting blade.

16. The method according to claim 14, wherein the step of moving the cutting blade through the stem includes moving the cutting blade generally transversely with respect to a longitudinal axis of the tree.

* * * * *

UNITED STATES PATENT AND TRADEMARK OFFICE
CERTIFICATE OF CORRECTION

PATENT NO.    : 5,465,770

DATED         : November 14, 1995

INVENTOR(S)   : Lansberry, John B.

It is certified that error appears in the above-identified patent and that said Letters Patent is hereby corrected as shown below:

On the Title page, after item

[56]  4,141,398  2/1979  Widegren et al. .......144/2 N"

Insert the following:

| | | | |
|---|---|---|---|
| --2,499,620 | 3/1950  | Alderman    | 37/144    |
| 2,895,236   | 7/1959  | Pilch       | 37/2      |
| 3,333,615   | 8/1967  | Robbins     | 144/208   |
| 3,719,217   | 3/1973  | Bottoms     | 144/2 Z   |
| 3,762,481   | 10/1973 | Allen et al.| 172/40    |
| 3,774,659   | 11/1973 | Bodine      | 144/34 R  |
| 3,914,883   | 10/1975 | Bodine      | 37/2 R    |
| 3,927,704   | 12/1975 | Wirt        | 144/34 E  |
| 3,958,613   | 5/1976  | Herz        | 144/2 N   |
| 3,999,582   | 12/1976 | Allen et al.| 144/3 D   |
| 4,067,369   | 1/1978  | Harmon      | 144/34 R  |
| 4,467,848   | 8/1994  | Schmid      | 144/4     |
| 4,624,293   | 11/1986 | Suezaki     | 144/2 Z   |
| 4,751,949   | 6/1988  | Berner      | 144/162 R |
| 4,913,203   | 4/1990  | Lessard     | 144/34 E  |

UNITED STATES PATENT AND TRADEMARK OFFICE
CERTIFICATE OF CORRECTION

PATENT NO. : 5,465,770
DATED : November 14, 1995
INVENTOR(S) : Lansberry, John B It is certified that error appears in the above-indentified patent and that said Letters Patent is hereby corrected as shown below:

5,082,036   1/1992   Vierikko   144/3 D--

Signed and Sealed this

Fourteenth Day of May, 1996

Attest:

BRUCE LEHMAN

*Attesting Officer*   *Commissioner of Patents and Trademarks*